United States Patent [19]
Brockett

[11] 3,936,573

[45] Feb. 3, 1976

[54] MICROCAPSULE HAVING HYDROPHILIC WALL MATERIAL AND CONTAINING WATER SOLUBLE CORE MATERIAL

[75] Inventor: Bruce W. Brockett, Dayton, Ohio

[73] Assignee: NCR Corporation, Dayton, Ohio

[22] Filed: Aug. 23, 1974

[21] Appl. No.: 499,820

Related U.S. Application Data

[62] Division of Ser. No. 159,312, July 2, 1971, Pat. No. 3,861,941.

[52] U.S. Cl. ............... 428/402; 252/316; 427/150
[51] Int. Cl.² ........................................... B01J 13/02
[58] Field of Search............ 117/36.2, 36.8, 100 A, 117/100 C, 100 R; 252/316; 428/402; 427/150

[56] References Cited
UNITED STATES PATENTS

| | | | |
|---|---|---|---|
| 3,418,656 | 12/1968 | Vassiliades | 117/36.2 |
| 3,516,943 | 6/1970 | Brynko | 252/316 |
| 3,594,328 | 7/1971 | Schibler | 252/316 |

*Primary Examiner*—Bernard D. Pianalto
*Attorney, Agent, or Firm*—Robert J. Shafer; E. Frank McKinney

[57] ABSTRACT

A pressure-rupturable, liquid-droplet-containing microcapsule having walls of hydrophilic polymeric film-material such as gelatin wherein the liquid core-material is a water-immiscible oil having water dissolved therein together with additional material which is water-soluble such as a water-soluble colorless chromogenic dye-precursor material or color-developing reactant material.

7 Claims, 2 Drawing Figures

PROCESS OF CAPSULE MANUFACTURE

MICROCAPSULE HAVING HYDROPHILIC WALL MATERIAL AND CONTAINING WATER SOLUBLE CORE MATERIAL

This is a division of application Ser. No. 159,312 filed July 2, 1971, and issued Jan. 21, 1975 bearing U.S. Pat. No. 3,861,941.

BRIEF SUMMARY OF THE INVENTION

This invention provides pressure-rupturable microcapsules having organic, hydrophilic, polymeric-film wall-material and oily core material which also includes, in solution, lesser amounts of water and attendant water-soluble materials; a process for making said microcapsules; and pressure-sensitive record sheet material containing said microcapsules. Oils for use herein as core-material droplets are, like all oils, immiscible with water but are selected to be capable of dissolving small amounts of water, at least about one percent by weight and preferably up to about ten percent by weight.

The process of manufacture taught herein includes the steps of preparing microcapsules having organic, hydrophilic, polymeric film material walls and an internal phase comprising droplets of oil, said oil being water-immiscible but capable of dissolving about 1–10 percent by weight of water, and modifying the thus-prepared capsules by bringing said capsules into contact with a concentrated aqueous solution of a water-soluble material. The walls of the microcapsules are preferably hardened before the modification step as long as the hardening step does not make the wall material hydrophobic. If the hardening of the hydrophilic wall material does make it hydrophobic, then the modification step should be carried out before the wall material is hardened. The modification step allows equilibration across the capsulewall boundary to give a final product which is a microcapsule having oily contents which are saturated with respect to water and the selected water-soluble agent. Of course some slight amount of oil probably also passes out of the capsule wall during the equilibration process, but in practice this is not found to be a significant amount. In practice, the only significant or noticeable process is an equilibration between a small amount of water on the inside of the capsule wall that does not contain any of the selected water-soluble agent and a large amount of water on the outside of the capsule wall that contains a large amount of the selected water-soluble agent. The internal oil material, having been selected to dissolve significant amounts of water (1 to 10 percent by weight) and associated water-soluble agents, merely acts as a carrier for the later-introduced aqueous material. The oily contents are never replaced by the process of this invention and remain in the core-material to give a final microcapsular product that is as stable, in regards to the retention of the contents, as are the common and widely used oil in gelatin microcapsules. The microcapsules, when ruptured in use, yield a liquid pay-load that contains water-soluble materials not heretofore available for use in the microcapsule art except at greatly increased expense and/or reduced shelf-life of the product. The microcapsules of this invention are essentially as cheap as any common oil in gelatin capsule and as effective in retaining the encapsulated agent during long shelf storage.

Pressure-sensitive record sheet material, containing microcapsules, prepared as above and having water-soluble colorless chromogenic dye-precursor material or color-developing reactant material as the attendant water-soluble material included in the oily core-material, is also provided by this invention. The record sheet materials of this invention are able to make use of water-soluble colorforming reactant materials and still have a commercially practical shelf life.

BACKGROUND OF THE INVENTION

Oil-containing, hydrophilic-walled microcapsules, such as those having hardened gelatin walls and core-material of any of a multitude of oils, have long been known and used in the pressure-sensitive record material art. Such microcapsules also have many other uses as containers for various materials such as odorants, medicaments, and pesticides. Because hydrophilic, polymeric film-forming materials are water-soluble or water-swellable even after hardening by cross-linking, the use of aqueous solutions as the corematerial of hydrophilic-walled microcapsules has been precluded. Great effort has been expended, with varying degrees of success, to contain water and water solutions in microcapsules since the early beginnings of encapsulation technology. Aqueous liquids have been encapsulated in hydrophobic-walled microcapsules by expensive processes which make use of expensive materials and give a product with severely limited shelf life. Hydrophilic-walled microcapsules having oily contents have been subjected to through-the-wall exchange procedures whereby the oily contents are replaced by lyophilic liquids which may have oil-soluble and/or water-soluble materials dissolved therein. Such a total replacement procedure is disclosed and claimed in U.S. Pat. No. 3,516,943 which issued June 23, 1970 on the application of Carl Brynko and Gerald M. Olderman. This procedure, although effective in making microcapsules having water-soluble materials in the core, involves the replacement of the original oily contents of the capsules with non-oily (water-soluble) liquids that are more difficult to retain than oils over extended periods of time. Various further improvements have dealt with this problem of prolonged retention as by the addition of an outer hydrophobic wall to preformed microcapsules such as the Brynko-Olderman microcapsules discussed above. Such improvement procedures have met with some success but are generally too expensive for widespread use.

DISCUSSION OF THE DRAWINGS

The steps of the process of this invention are schematically set out in FIG. 1. Microcapsules, containing a water immiscible oil capable of dissolving about 1 to 10 percent by weight of water and preferably about 2 to 10 percent as shown in Block (A) of FIG. 1, are mixed at Block (C) with an aqueous solution (Block (B)) of about 10 weight-percent of a pay-load agent, most commonly and usefully a color-forming reactant material. At the end of the mixing step, the oil inside the microcapsules will have effective amounts of water and water-soluble pay-load agent dissolved therein. Generally, saturation is rapidly achieved so that the oil will actually be saturated with water and water-soluble pay-load agent. The steps represented by Blocks (D) and (E) are optional. The microcapsules containing the pay-load agent may be used without isolation from the manufacturing vehicle or filtered and dried for use as a dry powder.

The core-material liquid of the microcapsules of Block (A) is a water-dissolving oil which serves as a reservoir to receive appreciable concentrations of the water-soluble pay-load agent of Block (B). The swellable hydrophilic film-material walls of the microcapsules, if not already water-swollen, become so during the mixing and aqueous contact at Block (C). Continuous stirring at this point is not necessary, mere mixing and standing being sufficient. If the hydrophilic film-material walls are already swollen prior to the mixing at Block (C), exposure at this point to the aqueous solution of Block (B) for 15 to 20 minutes is generally sufficient to saturate the core-material oil with the added water-soluble pay-load agent, said core-material oil already being saturated with water at the time the walls are swollen with water. If the walls of the microcapsules are not already swollen prior to the mixing step of Block (C), contact with the aqueous solution of Block (B) should be maintained until the walls are thoroughly swollen, usually about one to two hours, depending on the state and identity of the chosen wall material. The water in the walls of the swollen microcapsules serves as a " pipeline" to transfer the water-soluble pay-load agent from the external aqueous solution to the water-in-oil solution inside the capsule walls. The added water-soluble pay-load agent may advantageously also be soluble in oil. If the pay-load agent is markedly soluble in oil, quite high concentrations of the pay-load agent can be built up inside the capsule walls by the process of this invention. It should be noted that the pay-load agents eligible for use in this invention are distinguished by their water-solubility, appreciable oil-solubility of the pay-load agent being a secondary consideration in the practice of this invention. In prior art practice, water-soluble materials (whether oil-soluble or not) could not be encapsulated with hydrophilic film material such as gelatin in an aqueous vehicle because the water-solubility of the chosen agent caused it to end up in the relatively voluminous external phase rather than in the oily internal phase. Furthermore, the presence of water-soluble pay-load agents, such as salt materials, during the coacervation step of prior art capsule manufacture is prohibited in practice because such materials affect the coacervation and make the coacervation and oil-droplet wrapping steps of prior-art practice impossible to carry out in a controlled and satisfactory manner.

The water-soluble pay-load agent of Block (B) has been described as being present in the aqueous solution to the extent of about 10 weight percent. This figure is not critical but is a convenient amount to give a saturated internal phase solution of the pay-load agent quickly. In practice, during the mixing step of Block (C), small samples of the treated capsules can be removed from the mixing vessel for testing. If, as is preferred, the pay-load agent is a color-forming reactant material the removed capsules can be tested against a receiving sheet sensitized with a co-reactant material. If the developed test color is too light, additional pay-load agent may be added to the aqueous external solution and/or the contact time can be extended until further tests on later-collected samples of treated capsules show no further increase in developed-color intensity. At this point, saturation of the internal phase oil with water and pay-load agent may be assumed. If the test color is still lighter than desired, further enhancement can be achieved by the use of more capsules per unit area and/or the use of more concentrated sensitizing co-reactant on the receiving sheet.

The product of the process depicted in FIG. 1 is represented by FIG. 2 which shows an enlarged view of a microcapsule having a wall (10) of organic, polymeric hydrophilic film material (preferably hardened) such as gelatin or poly(vinyl alcohol). The core-material (11) is a liquid droplet of water-immiscible oil, selected to be capable of dissolving 2 to 10 weight percent of water, having dissolved therein water and a useful amount of a water-soluble pay-load agent, preferably a color-forming reactant material. The dissolved water and pay-load agent are preferably present in the core-material at a concentration to saturate the oil therewith.

When it is said that the microcapsules of this invention have "hydrophilic water-swellable, organic, polymeric-film wall material" it is meant that the wall includes such materials, for instance gelatin or poly(vinyl alcohol) and not that the wall as a whole is necessarily hydrophilic and water-swellable in its final state. It is well known that walls of hydrophilic materials may be treated to make them hydrophobic and not swellable with water. The process of this invention does not preclude later modification of the hydrophilic water-swellable walls, after introduction of the pay-load agent, to make them hydrophobic. Even though the capsule walls are made hydrophobic, said walls still contain the defined hydrophilic material necessary to the practice of this invention and the product so-made falls within the embrace of this invention.

DETAILED DESCRIPTION

Figure 1:
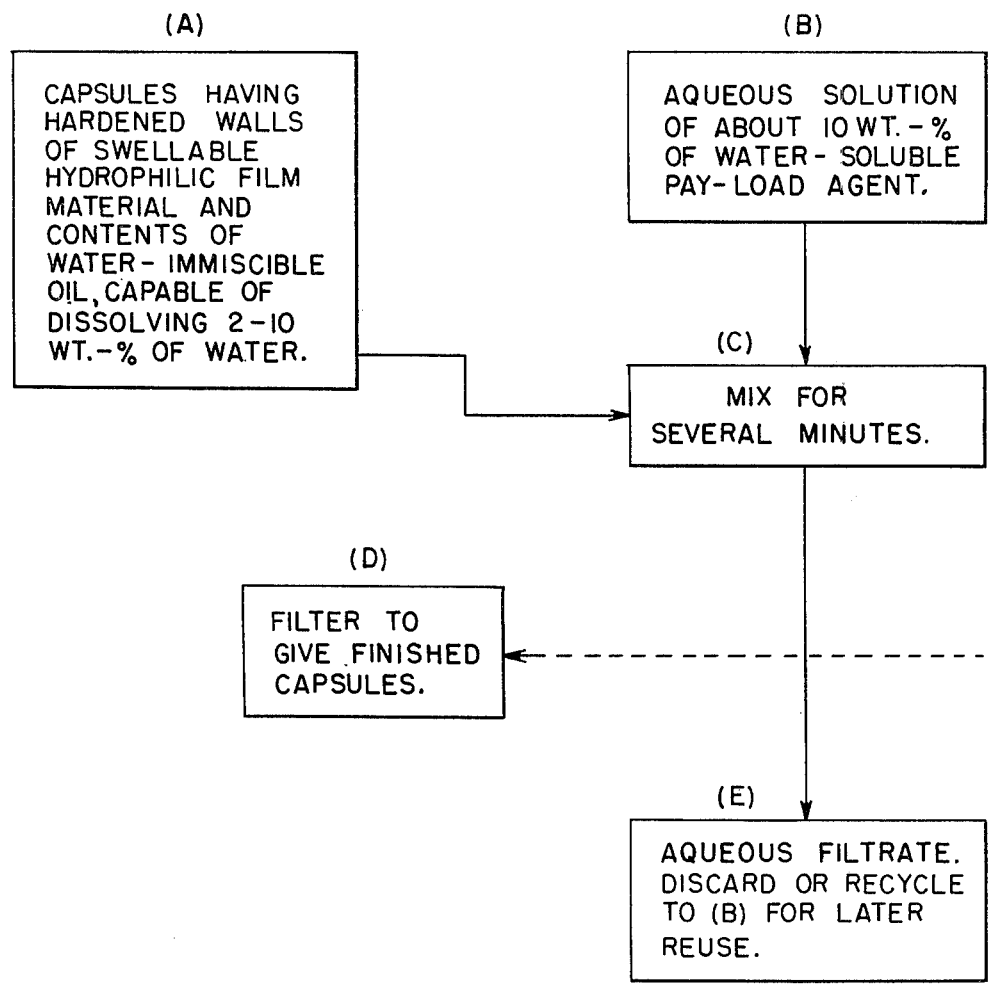
Figure 2:
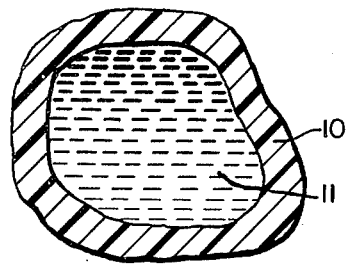

The microcapsules, processes for making them, and pressure-sensitive record sheet material using them are set out in detail in the specific examples below. A general discussion of equivalent materials and procedures is given here to aid in understanding the specific examples which are illustrative and not limiting.

Capsule-wall material can be any of the many known organic, hydrophilic, polymeric, film-forming materials including gelatin, gum arabic, methyl cellulose, poly(vinyl alcohol), zein, casein and combinations thereof. The only requirement herein is that the wall material be oil-retaining and water permeable. Preferred is a combination of gelatin-gum arabic as taught and claimed by B. K. Green and Lowell Schleicher in U.S. Pat. No. 2,800,457 which issued July 23, 1957.

Core-material oils can be any oil capable of dissolving about one to ten percent by weight of water. Oils that are capable of dissolving only much less than about 1 percent of their weight of water will, in use, give a very low yield of the selected water-soluble agent. Of course the amount of said agent needed at the time of use will depend on the agent's potential strength but, generally speaking, the lower limit of 1 percent, and preferably 2 percent, water solubility has been found to be a practical one. The upper limit of about 10 percent water solubility in the selected oil is governed by the requirements of the capsule-making process. Oils that dissolve much more than 10 percent of their weight of water tend to be difficult to encapsulate with hydrophilic wall material in an aqueous manufacturing vehicle. Furthermore, capsules with high aqueous core material content lose their "predominantly oily" character so that long-time retention of the contents becomes a problem and one of the objects of this invention is defeated. Oils of medium to low volatility and viscosity are preferred because they are more easily handled during the encapsulation process, are more readily retained inside the capsule wall if not highly volatile, and are more readily used in transfer copy processes if not highly viscous. In practice, organic phosphate esters, including trialkyl and triaryl phosphate, meet these criteria nicely. Preferred are tricresyl phosphate and tributyl phosphate mixtures.

Water-soluble agents for inclusion in the core-material as the pay-load agent are determined by the ultimate use to be made of the microcapsules. A variety of water-soluble agents is set out in tabular form in Example 1. Eligible water-soluble agents should be soluble in water to the extent of about 20 percent by weight. Colored agents may be used as well as colorless ones, but it is anticipated that this invention will find its widest use in "carbonless carbon-paper" constructions where colorless color-formers are generally used.

Record sheet materials are generally of the types and structures known as carbonless carbon-paper, best exemplified by "NCR paper". Various sheet materials such as plastic films, synthetic "papers", leather, cloth and paper are usuable herein, but paper is of course preferred. Copy papers and copy paper forms that may make use of the microcapsules of this invention include transfer sheets, self-contained sheets, and manifold copy sheet sets having transfer-receiving sheets, wherein liquid-containing microcapsules are distributed in a sheet or on one or more surfaces of one or more sheets of paper. Appropriate receiving sheets for use with capsule-containing transfer sheets, depend on the water-soluble agent selected for transfer thereto. A variety of transfer sheets is disclosed in the table of Example 1. Generally speaking, because the liquid transferred in use is predominantly oily in character, despite its aqueous "cargo", the receiving sheet surface should be oil-receptive and oil-responsive. That is, if the water-soluble agent transferred in use is to undergo a chemical reaction, such as a color-forming reaction with a co-reactant on the receiving sheet surface, the co-reactant provided on the receiving sheet surface should preferably be oil-soluble or at least capable of reacting with an oily solution at its surface.

It should be emphasized that the process of this invention does not involve replacement of oily capsule contents with aqueous material. The oily material originally present at the time of manufacture of the capsules remains present throughout the modification and use of the capsules of this invention. The process of this invention depends on providing said oil contents with a load of the desired aqueous agent, the choice of which aqueous agent depending on the intended use of the capsules. The internal oil is selected to be capable of dissolving at least about one up to a maximum of about 10 percent of its weight of water and, if it is not treated by the process of this invention, it will do so by picking up moisture from the atmosphere or from the manufacturing vehicle. The so picked-up water will remain inside the capsule walls as long as the oil is retained, which as is well known from the capsule art, can easily be retained for many years. By making positive use of this property of certain oils to hold appreciable amounts of water, a property that has been ignored in the prior art, the process of this invention (which includes the step of exposing the selected oil-containing, hydrophilic-walled capsules to a concentrated aqueous solution of a useful water-soluble agent) provides oil-containing capsules, stable as to content-retention, which deliver substantial amounts of water and water-soluble agents when the walls are ruptured.

The specific examples will set forth useful materials and methods of realizing the benefits of this invention. In the following examples, all parts or ratios are parts by weight unless otherwise specified.

EXAMPLE 1

Gelatin-gum arabic-walled capsules containing liquid oil droplets (a 1:1 mixture of tricresyl phosphate and tributyl phosphate) were prepared according to the method taught and claimed by U.S. Pat. No. 3,041,289 which issued June 26, 1962 on application of Bernard Katchen and Robert E. Miller. The microcapsules, after hardening by cross-linking with glutaraldehyde as taught in the above reference but while still in the manufacturing vehicle were treated to introduce various water-soluble materials into the capsular corematerial. The capsular slurry was divided into seven equal parts, and each part was treated with one of the following water-soluble agents: calcozine green dye, copper chloride, zinc chloride, pyrogallol, ferric chloride, nickel acetate, and potassium iodide-iodine. The capsular slurry was stirred intermittently for 1 hour in the presence of the added agent now in solution in the aqueous slurry vehicle. At the end of this time, protective stilt particles and binder material was added to the aqueous capsular slurries, as is common in the paper-coating art. In most cases, alpha-cellulose floc fibers were used as stilt particles (16 parts to 100 parts of capsules) and cooked starch as binder material (20 parts of a 20 percent by weight aqueous cooked starch solution per 100 parts of capsules). Poly(vinyl alcohol) was used as the binder material in the case of the capsules containing the potassium iodideiodine combination because starch is the color-developing co-reactant in that case. The capsular slurries were then coated onto 13 pound bond paper with a No. 18 Mayer rod and air dried. Total dry coat weight in each case was about 4.5 pounds per ream of 500 sheets measuring 25 inches by 38 inches. The ability of the above coated sheets to transfer the added water-soluble agent was then measured by a standard Typewriter Intensity test of each type of sheet used against an appropriate facing receiving sheet. The Typewriter Intensity test consists of typing on the uncoated side of a capsule-coated transfer sheet having its capsule-coated side opposing a receiving sheet. The colorless transferred agent released from the pressure-ruptured microcapsules is developed by a co-reactant on the facing side of the receiving sheet. The transfer print was allowed to age for twenty minutes to minimize differences in the rate of development of print color before reflectance values were determined on the receiving sheet transfer print area and a background area of the receiving sheet. Transfer Intensity (TI) is defined as 100 times the reflectance of the printed area divided by the reflectance of the background area. Thus a TI value of 100 represents no discernible print and lesser values represent darker (less reflecting) prints. TI values of about 50 or slightly less are commonly found when commercial copy paper sets are used. The following Table gives the results of testing for each of the capsule-coated sheets described above.

| Water-Soluble Agent | Receiving Sheet Co-Reactant | Print Color | TI |
|---|---|---|---|
| Calcozine Green V | None | Green | 51 |
| Copper chloride | Benzoyl-leuco-methylene blue | Blue-gray to blue-green | 60 |
| Zinc chloride | Crystal Violet Lactone (CVL) | Blue | 37 |
| Zinc chloride | "Vermillion"-"Pink" | Red | 68 |
| Zinc chloride | CVL-"Vermillion" | Purple | 46 |
| Zinc chloride | CVL-CMBIPS | Blue-black | 38 |
| Zinc chloride CVL | N-phenylauramine-Blue-black | | 31 |
| Pyrogallol | Ferric benzoate | Black | 20 |
| Ferric chloride | Pyrogallol | Brown-black | 30 |
| Ferric chloride | N,N'-bis(dibenzyl)-dithiooxamide | Green | 64 |
| Nickel acetate | N,N'-bis(dibenzyl)-dithiooxamide | Red | 63 |
| Potassium iodide-iodine | Starch | Red-brown | 20 |

Calcozine Green V is a water soluble green dye, not a colorless dye-precursor material.
"Vermillion" is a colorless-dye-precursor material, 2-chloro-6-diethylamino-3-methyl-spiro [9-H-xanthene-9,1'-phthalide], that gives a vermillion color when developed with acid.
"Pink" is a colorless dye-precursor material, 9-diethylamino-spiro-[1,2-H-benzo-(a)-xanthene-12,1'-phthalide], that gives a pink color when developed with acid.
CMBIPS is 1, 3, 3, trimethyl-6'-chloro-8'-methoxy [2'H-1'-benzopyran-2,2'-indoline].

In all cases, the above-described capsule-coated sheets were found to still perform well after six weeks of storage under ambient room conditions.

EXAMPLE 2

The procedure of Example 1 was followed except that in this case, the capsules were isolated by filtration and air drying, following their modification by treatment with the added water-soluble agents. The capsules could be stored for indefinite periods of several weeks prior to coating on paper without any serious loss of activity. If the dried capsules were re-suspended in large amounts of water for extended periods of time (one to two hours or more), the water-soluble agents could be at least partly leached out. However, aqueous coating slurries of about 30 percent solids content could be made up and coated immediately to give good functional sheets.

EXAMPLE 3

The procedure of Example 1 was followed except that N,N-diethyldecanamide was substituted for the 1:1 mixture of tricresyl phosphate-tributyl phosphate used as the core-material oil in that example. The sheets of this example functioned satisfactorily but were not generally as good as the sheets of Example 1.

Other good oils found to be useful herein include 2-ethylhexanoic acid, di(2-ethylhexyl)phosphonic acid, 2-ethylhexanol, isooctanol (mixed isomers), di-isobutyl carbinol, 3-methylbutyraldehyde, tri(2-ethylhexyl)phosphate, N,N-dibutylbutyramide, and dibutyl butylphosphonate.

What is claimed is:

1. A pressure-rupturable liquid-droplet-containing microcapsule comprising hydrophilic, water-swellable, organic, polymericfilm wall material and core material comprising a water-immiscible oil which is capable of dissolving about one to ten percent by weight of water, said oil being further characterized by having dissolved therein water and a water-soluble color-forming reactant material all mutually dissolved to yield a core material of a single phase solution.

2. The microcapsule of claim 1 wherein the oil is an organic phosphate ester.

3. The microcapsule of claim 1 wherein the color-forming reactant material is zinc chloride.

4. The microcapsule of claim 1 wherein the core-material oil is saturated with water and the water-soluble color-forming reactant material.

5. The microcapsule of claim 1 wherein the wall material is hardened hydrophilic film material.

6. The microcapsule of claim 5 wherein the hydrophilic film material is hardened by addition thereto of hydrophobic organic polymeric film material.

7. The microcapsule of claim 5 wherein the wall material includes gelatin, the oil is selected from the group consisting of tricresyl phosphate and tributyl phosphate, and the color-forming reactant material is zinc chloride.

* * * * *